United States Patent
Todd et al.

(10) Patent No.: US 10,154,103 B2
(45) Date of Patent: Dec. 11, 2018

(54) SYSTEM AND METHOD FOR EXCHANGING A HISTORY OF USER ACTIVITY INFORMATION

(71) Applicant: AT&T INTELLECTUAL PROPERTY I, L.P., Atlanta, GA (US)

(72) Inventors: Steven Todd, Westfield, NJ (US); Randall Stephen Hansen, Oceanport, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 196 days.

(21) Appl. No.: 14/862,804

(22) Filed: Sep. 23, 2015

(65) Prior Publication Data
US 2017/0085658 A1  Mar. 23, 2017

(51) Int. Cl.
H04L 29/08 (2006.01)

(52) U.S. Cl.
CPC ............ *H04L 67/22* (2013.01); *H04L 67/306* (2013.01)

(58) Field of Classification Search
CPC .............................. H04L 67/22; H04L 67/306
See application file for complete search history.

(56) References Cited

U.S. PATENT DOCUMENTS

| | | | |
|---|---|---|---|
| 6,286,030 B1 * | 9/2001 | Wenig | G06F 11/323 709/203 |
| 6,877,007 B1 * | 4/2005 | Hentzel | G06Q 30/02 707/999.01 |
| 7,076,504 B1 | 7/2006 | Handel et al. | |
| 8,209,548 B2 | 6/2012 | Botzum et al. | |
| 8,543,675 B1 * | 9/2013 | Yiu | G06F 3/0484 709/223 |
| 8,914,850 B1 | 12/2014 | Mateer et al. | |
| 2002/0038363 A1 * | 3/2002 | MacLean | G06Q 10/087 709/224 |
| 2003/0097451 A1 | 5/2003 | Bjorksten et al. | |
| 2005/0086255 A1 * | 4/2005 | Schran | G06F 11/34 |
| 2007/0162292 A1 | 7/2007 | Bell et al. | |
| 2009/0240571 A1 * | 9/2009 | Bonner | G01S 5/14 705/27.1 |
| 2010/0281156 A1 * | 11/2010 | Kies | G06F 11/3414 709/224 |
| 2012/0079029 A1 * | 3/2012 | Damola | H04L 12/66 709/204 |
| 2013/0204737 A1 | 8/2013 | Agarwal et al. | |
| 2013/0218721 A1 | 8/2013 | Borhan et al. | |
| 2013/0347078 A1 | 12/2013 | Agarwal et al. | |
| 2014/0095871 A1 * | 4/2014 | Hoard | H04L 63/0428 713/168 |
| 2014/0162706 A1 * | 6/2014 | Daly | H04W 4/12 455/466 |

(Continued)

*Primary Examiner* — Abdulkader M Alriyashi
(74) *Attorney, Agent, or Firm* — Greenblum & Bernstein, P.L.C.

(57) ABSTRACT

Devices, systems, and methods for exchanging a history of user activity information are provided. A history of user activity of a target user conducted through a device is collected and stored at a server over a network. A key corresponding to the history of user activity is generated and transmitted to the device. The key is received from a different device. The first history of user activity is retrieved based on the received key and transmitted to the different device.

17 Claims, 8 Drawing Sheets

(56) References Cited

U.S. PATENT DOCUMENTS

| | | | |
|---|---|---|---|
| 2014/0359489 A1* | 12/2014 | Zhao | G06F 3/0482 |
| | | | 715/760 |
| 2015/0066707 A1 | 3/2015 | Unger et al. | |
| 2016/0182658 A1* | 6/2016 | Allinson | H04L 67/1097 |
| | | | 709/224 |
| 2016/0275545 A1* | 9/2016 | Dasdan | G06Q 30/0244 |
| 2016/0292260 A1* | 10/2016 | Burgmeier | H04L 67/22 |

* cited by examiner

SYSTEM AND METHOD FOR EXCHANGING A HISTORY OF USER ACTIVITY INFORMATION

BACKGROUND

1. Field of the Disclosure

The present disclosure relates to the field of network communication. More particularly, the present disclosure relates to exchange of a history of activity information between different devices.

2. Background Information

Consumers may communicate with organizations or corporations through a variety of devices and communication media, e.g., automated call systems, live agents, smartphone applications, web pages, or instant messaging. Consumers may use different media even when pursuing a single problem or interest. However, these media may be independently managed and operate independent of one another. Further, user account information may provide limited information of its users.

DETAILED DESCRIPTION

In view of the foregoing, the present disclosure, through one or more of its various aspects, embodiments and/or specific features or sub-components, is thus intended to bring out one or more of the advantages as specifically noted below.

Methods described herein are illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods. Further, any reference to claim elements in the singular, for example, using the articles "a," "an" or "the", is not to be construed as limiting the element to the singular.

Figure 1:
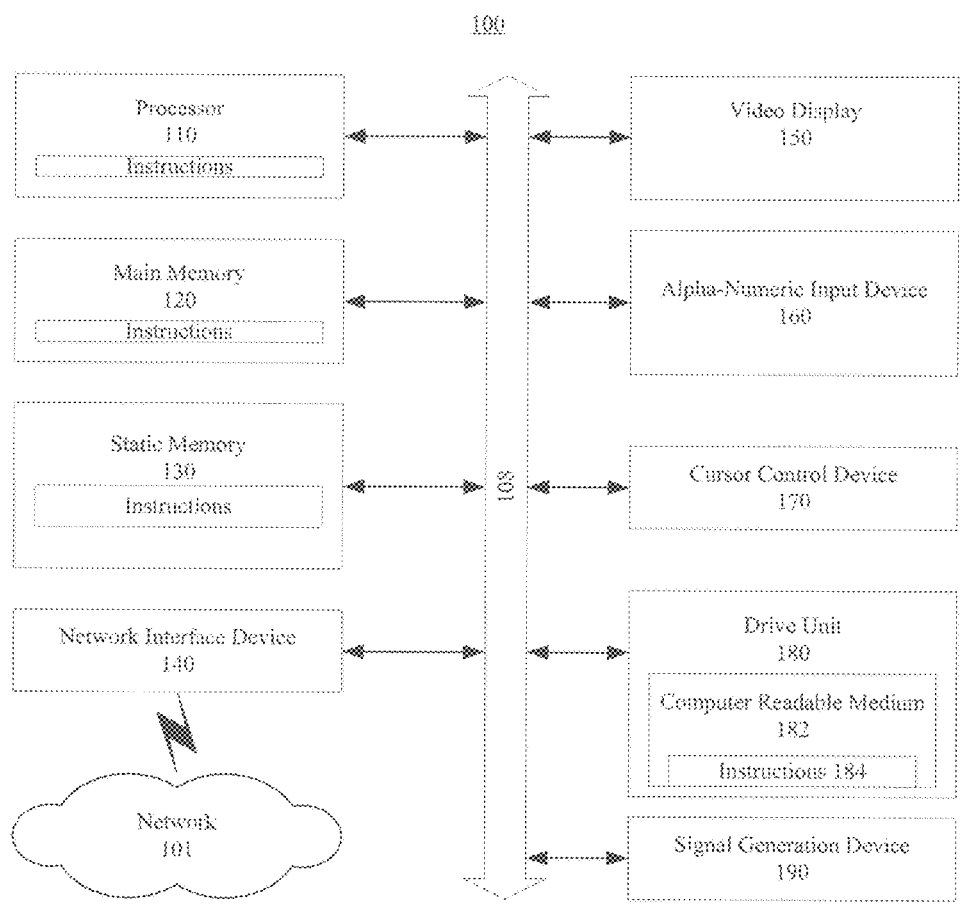
FIG. 1 shows an exemplary general computer system that includes a set of instructions for exchanging a history of activity information.

FIG. 1 is an illustrative embodiment of a general computer system, on which a method of exchanging a history of user activity information can be implemented, and which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system 100 may operate in the capacity of a server or as a client user computer in a server-client user network environment, or as a peer computer system in a peer-to-peer (or distributed) network environment. The computer system 100 can also be implemented as or incorporated into various devices, such as a stationary computer, a mobile computer, a personal computer (PC), a laptop computer, a tablet computer, a wireless smart phone, a set-top box (STB), a personal digital assistant (PDA), a communications device, a control system, a web appliance, a network router, or any other machine capable of executing a set of instructions (sequential or otherwise) that specify actions to be taken by that machine. The computer system 100 can be incorporated as or in a particular device that in turn is in an integrated system that includes additional devices. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 includes a processor 110. A processor for a computer system 100 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A processor is an article of manufacture and/or a machine component. A processor for a computer system 100 is configured to execute software instructions in order to perform functions as described in the various embodiments herein. A processor for a computer system 100 may be a general purpose processor or may be part of an application specific integrated circuit (ASIC). A processor for a computer system 100 may also be a microprocessor, a microcomputer, a processor chip, a controller, a microcontroller, a digital signal processor (DSP), a state machine, or a programmable logic device. A processor for a computer system 100 may also be a logical circuit, including a programmable gate array (PGA) such as a field programmable gate array (FPGA), or another type of circuit that includes discrete gate and/or transistor logic. A processor for a computer system 100 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the computer system 100 includes a main memory 120 and a static memory 130 that can communicate with each other via a bus 108. Memories described herein are tangible storage mediums that can store data and executable instructions, and are non-transitory during the time instructions are stored therein. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A memory described herein is an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted.

As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard/virtual keyboard or touch-sensitive input screen or speech input with speech recognition, and a cursor control device 170, such as a mouse or touch-sensitive input screen or pad. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. Sets of instructions 184 can be read from the computer-readable medium 182. Further, the instructions 184, when executed by a processor, can be used to perform one or more of the methods and processes as described herein. In a particular embodiment, the instructions 184 may reside completely, or at least partially, within the main memory 120, the static memory 130, and/or within the processor 110 during execution by the computer system 100.

In an alternative embodiment, dedicated hardware implementations, such as application-specific integrated circuits (ASICs), programmable logic arrays and other hardware components, can be constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

The present disclosure contemplates a computer-readable medium 182 that includes instructions 184 or receives and executes instructions 184 responsive to a propagated signal; so that a device connected to a network 101 can communicate voice, video or data over the network 101. Further, the instructions 184 may be transmitted or received over the network 101 via the network interface device 140.

Figure 2:
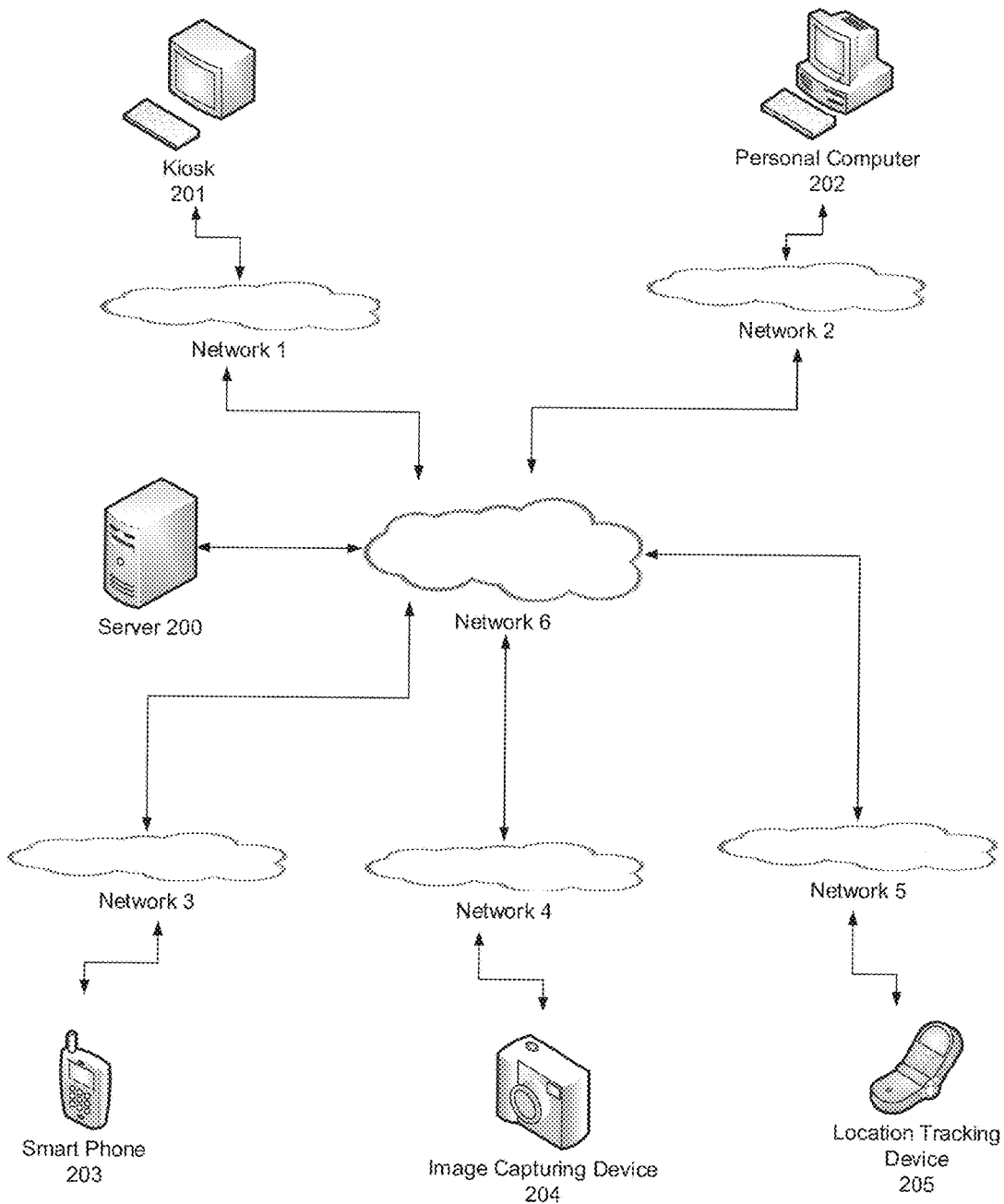
FIG. 2 shows an exemplary system to facilitate storing and exchange of a history of user activity information, according to an aspect of the present disclosure.

FIG. 2 shows an exemplary system to facilitate storing and exchange of a history of user activity information, according to an aspect of the present disclosure.

Referring to FIG. 2, a server 200 may receive or collect histories of user activity of various users conducted through one or more devices. A history of user activity may be collected through, without limitation, a kiosk 201, a personal computer 202, a smart phone 203, an image capturing device 204, and a location tracking device 205. However, aspects of the disclosure are not limited to the described devices, such that the server 200 may also receive or collect information from any computing device having at least a processor and/or a transmitter/receiver, such as a smart appliances, wearable computing devices (e.g., smart watches, fitness tracking devices, etc.), computing devices provided at a retailer (e.g., mobile scanners, shopping carts/baskets with location tracking device, kiosks etc.), and the like.

In an example, user activity may include, without limitation, navigating through a website or an application, interaction on a social networking application or website, capturing or sharing of images or other information, physical movements with a device, and the like.

The various devices may transmit or receive information to or from the server 200 through or via a plurality of networks. The kiosk 201 may communicate through a network 1, the personal computer 202 may communicate through a network 2, the smart phone 203 may communicate through a network 3, the image capturing device 204 may communicate through a network 4, and the location tracking device 205 may communicate through network 5. Further, the server 200 may communicate with one or more of the various devices through a network 6.

Network 1, network 2, network 3, network 4, network 5 and/or network 6 may include a mobile network, wireless network, wired network, a telecommunications network, or any (other) data network that allows computing devices to exchange data. Although the server 200 is illustrated as communicating with other devices through the network 6, aspects of the present disclosure are not limited to the described network, such that the server 200 may communicate with one or more of the devices through a different network.

Further, the information received through the various devices may go through a conversion process to convert the received information to a singular format for use by the server 200. Similarly, when information is transmitted from the server 200 to the respective devices, the transmitted information may also go through a conversion process for receipt or use by the respective devices.

Figure 3:
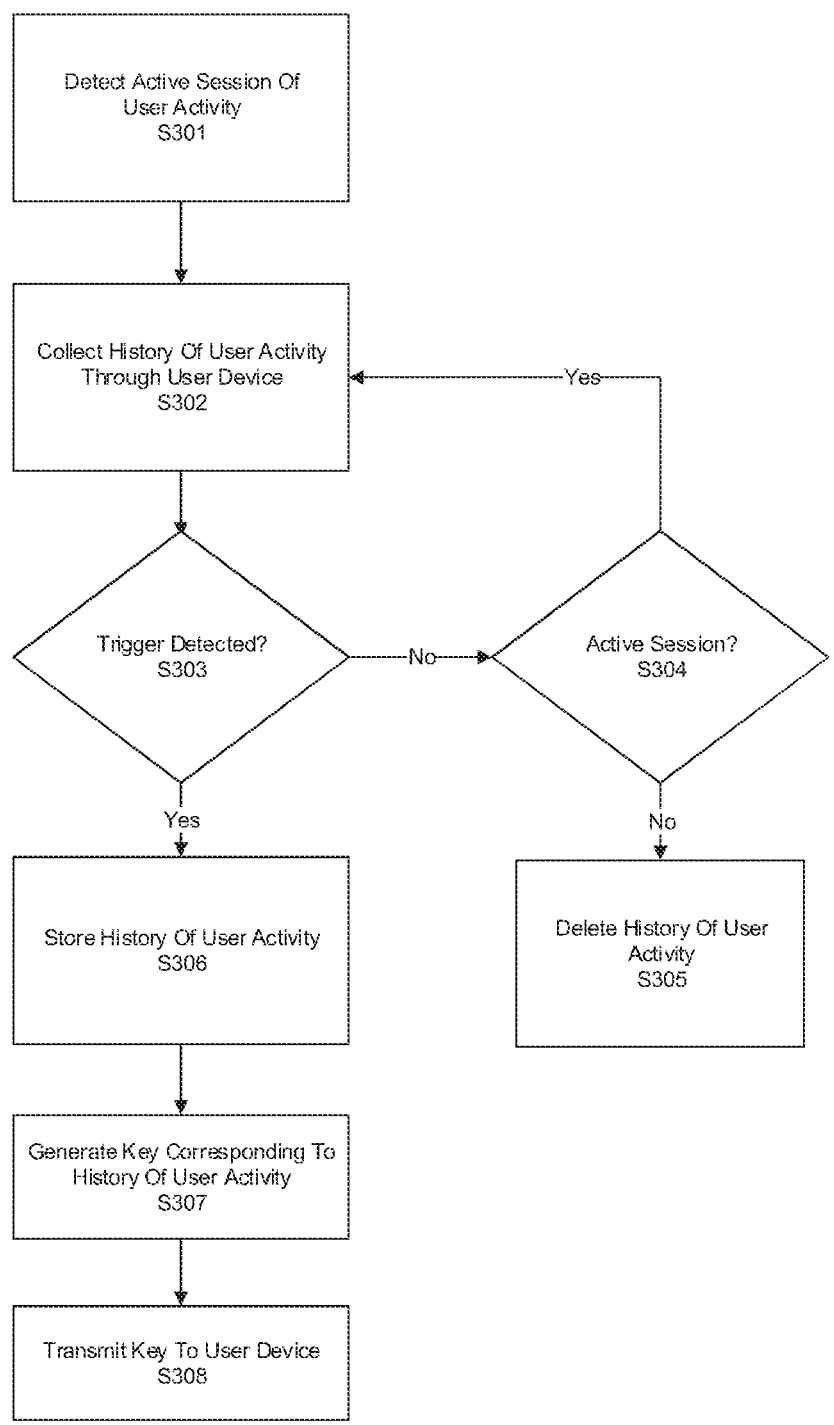
FIG. 3 shows an exemplary method for collecting and managing a history of user activity information for exchange, according to an aspect of the present disclosure.

FIG. 3 shows an exemplary method for collecting and managing a history of user activity information for exchange, according to an aspect of the present disclosure.

At S301, an active user activity session using a user device of a target user is detected. Activation of the user activity session may be initiated by, without limitation, launching of an application, launching of a web browser, entering a physical building, scanning of a product, capturing of an image, and the like. The user device may include a personal computer, a smart phone, a laptop computer, a tablet computer, a location detecting device, an image capturing device, a wearable computing device (e.g., smart watches, fitness tracking devices, etc.), and the like. The target user may refer to an individual user or a group of users having a common characteristic, such as household members residing at the same physical address.

At S302, user activity conducted through the user device is collected by a server. A history of the user activity conducted through the user device may be collected in real-time, at predetermined intervals, or in response to an input, such as clicking of a hyperlink or navigating to a different webpage. In an example, a user activity may include, without limitation, navigating through a website of a certain retailer, interaction on a social network application or website, capturing or sharing of images or other information, physical movement with a device, and the like. Further, a history of the user activity may include or indicate, for example, products researched on a website, clicking of an advertisement on a social networking application, capturing of images of a product of interest, a visit to a brick-and-mortar store to browse the product, movements and duration at a certain location within the brick-and-mortar store (e.g., 10 minutes at a light department and 5 minutes at a plumbing department in a hardware store), and the like. Some of the information that may be collected in the history of user activity may include time, date, location, duration of time spent researching a particular product, duration of time spent on a particular website or webpage, frequency of visit to a particular website, IP address, device information (e.g., IMEI of a smart phone), and the like.

At S303, a determination of whether a trigger for storing the collected history of user activity has been detected. A trigger may be active or passive. In an example, a trigger may be a navigation operation on a website, such as, a click of a particular button, a hyperlink, or a "contact us" webpage. A trigger may also include one or more predetermined conditions, such as a closing of a browser, duration of time spent on a website or researching a particular product, closing of a webpage, searching for a coupon, and the like. Further, a trigger may also include physical activities, such as a physical departure from a store, accessing a kiosk at a store, or capturing of an image. However, aspects of the disclosure are not limited thereto, such that the collected history of user activity may be stored automatically once the user activity session is no longer active.

If a trigger is not detected at S303, a determination of whether the user activity session is still in an active state is made at S304. For example, if an internet browser is closed by the target user or if no activity is detected on a webpage for a predetermined period of time, the user activity session may be determined to be no longer active. Also, if the target user visits a brick-and-mortar store, leaving of such store may determine that the user activity session is no longer active. If the user activity session is determined to be no longer active, the collected history of user activity is purged or deleted from a server at S305. However, aspects of the disclosure are not limited thereto, such that the collected history of user activity may be stored in a temporary storage, which may store the collected information for a limited period of time before deletion.

On the other hand, if the user activity session is determined to be in an active session, the history of user activity is continually collected at S302.

If the trigger is detected at S303, the collected history of user activity is stored in a memory of a server at S306. At S306, the entire history of user activity collected in a single session may be stored, or a select subset of the collected history of user activity may be stored. In an example, only a user activity meeting or exceeding a predetermined threshold may be stored in the history of user activity. More specifically, in a web browsing session, only webpages the target user spends more than 1 minute may be included in the history of user activity, or only products that the target user seeks specifications for may be included in the history of user activity. By selectively storing only certain types of user activities rather than all of the collected user activity in the history of user activity, server performance may be improved by using less storage memory while still retaining relevant information for customer support.

At S307, a key corresponding to the stored history of user activity is generated. The key may be, without limitation, a combination of alphanumeric values, a combination of number, a keyword, or a link to the collected or stored history of user activity. Further, the key may also be a compressed data of the collected or stored history of user activity. The key may be a single-use key that may be no longer usable once the corresponding history of user activity is retrieved using the key. However, aspects of the disclosure are not limited thereto, such that that the key may have a limited number of usage, or may have unlimited usage. Further, the key may have an expiration period (e.g., 3 days) before the key is purged from the server or no longer useable. By providing limited duration of storage, the server may free up more storage space to accommodate other users.

At S308, the key is transmitted to the user device of the target user. The key may be provided by the target user when interacting with a support staff member, such as a customer support agent at a customer support center. The key may be transmitted automatically or in response to an input or a request provided by the user device of the target user. The support staff, upon receipt of the key, may retrieve corresponding stored history of user activity to expedite servicing of the target user. By reviewing the stored history of user activity before or while interacting with the target user, the support staff may more quickly understand what the target user is interested in and looking to achieve when contacting the support staff. Further, if the key is provided to a connecting server within the customer support center before the target user is connected to a customer support agent, the connecting server may route the target user in view of the history of user activity. In an example, if the history of user activity indicates that the target user primarily researched product A, the target user may be routed to a customer support agent specializing in product A for improved servicing. By providing expedited routing of users, computing resources (e.g., excessive hold times, multiple transfers, multiple calls to resolve the same issues, etc.) spent on the users at the customer support center may be reduced.

Figure 4:
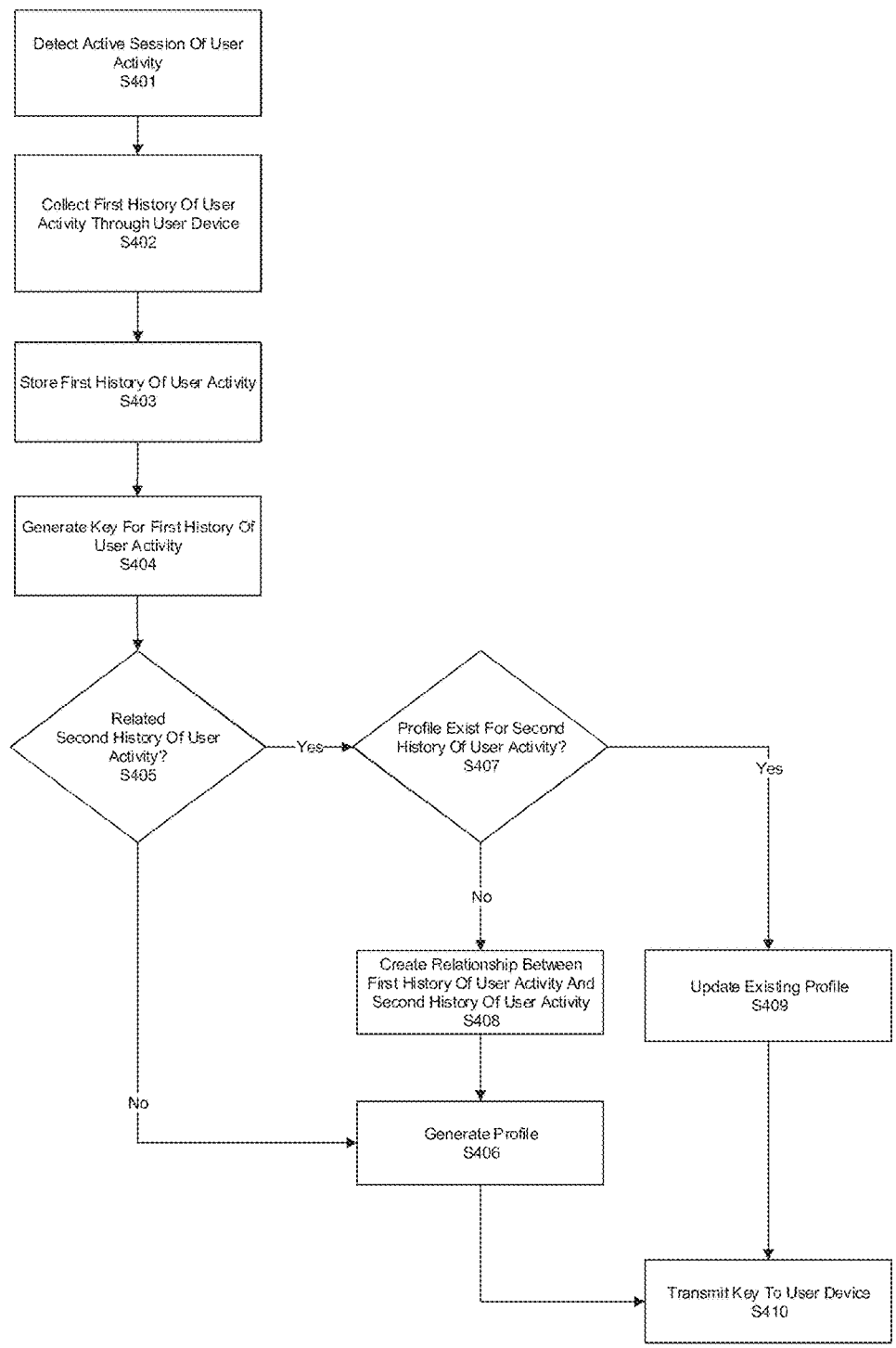
FIG. 4 shows an exemplary method for collecting and managing a history of user activity information for exchange, according to an aspect of the present disclosure.

FIG. 4 shows an exemplary method for collecting and managing a history of user activity information for exchange, according to an aspect of the present disclosure.

At S401, an active user activity session using a user device of a target user is detected. Activation of the user activity session may be initiated by, without limitation, launching of an application, launching of a web browser, entering a physical building, scanning of a product, capturing of an image, and the like. The user device may include a personal computer, a smart phone, a laptop computer, a tablet computer, a location detecting device, an image capturing device, a wearable computing device (e.g., smart watches, fitness tracking devices, etc.), and the like. The target user may refer to an individual user or a group of users having a common characteristic, such as household members residing at the same physical address.

At S402, user activity conducted through the user device during the active session is collected as a first history of user activity. The first history of user activity may be collected in real-time, at predetermined intervals, or in response to an input, such as clicking of a hyperlink or navigating to a different webpage. In an example, user activity may include, without limitation, navigating through a website of a certain retailer, interaction on a social network application or website, capturing or sharing of images or other information, physical movement with a device, and the like. Further, a history of the user activity may indicate, for example, products researched on a website, clicking of an advertisement on a social networking application, capturing of images of a product of interest, a visit to a brick-and-mortar store to browse the product, movements and duration at a certain location within the brick-and-mortar store (e.g., 10 minutes at a light department and 5 minutes at a plumbing department in a hardware store), and the like. Some of the information included in the history of user activity may include time, date, location, duration of time spent researching a particular product, duration of time spent on a particular website or webpage, frequency of visit to a particular website, IP address, device information (e.g., IMEI of a smart phone), and the like.

At S403, the collected first history of user activity is stored. The collection and storing of the first history of user activity may be performed automatically as a matter of course or in response to an input or a trigger condition. Some or all of the user activity during an active session may be included in the first history of user activity. For example, only certain user activity meeting or exceeding a predetermined threshold may be included in the first history of user activity.

At S404, a key corresponding to the stored first history of user activity is generated. The key may be, without limitation, a combination of alphanumeric values, a combination of number, a keyword, or a link to the collected or stored history of user activity. Further, the key may also be a compressed data of the collected or stored history of user activity. The key may be a single-use key such that the key is no longer usable once the corresponding history of user activity is retrieved using the key. However, aspects of the disclosure are not limited thereto, such that that the key may have a limited number of usage, or may have unlimited usage. Further, the key may have an expiration period (e.g., 3 days) before the key is purged from the server or no longer accessible. By providing limited duration of storage, the server may free up more storage space to accommodate other users.

At S405, a determination of whether a related history of user activity of the target user, such as a second history of user activity, is stored is made. For example, a relationship between histories of user activity may be determined based on device information, IP address, device registration information, and the like. User activity of the previously stored history of second user activity of the target user may have been conducted through the same user device at a different time or session, or conducted through a different device of the target user.

At S405, if it is determined that the related second history of user activity is not present or stored, a profile of the target user is generated based on the stored first history of user activity at S406. A profile of the target user may include information included in or related to the user activity, such as device information, IP address, key generated, stores visited, approximate location based on visited store or IP address, products of interests, socioeconomic information based on products of interest, and the like. The generated profile of the target user may allow a more tailored or expedited service to be provided without creating a user account, such as targeted marketing, customized web service, connecting to a customer support agent with appropriate skills, and the like.

At S405, if it is determined that the related second history of user activity is present, a determination of whether a profile already exists for the related second history of user activity is made at S407.

At S407, if it is determined that the profile does not yet exist for the second history of user activity, a relationship between the first history of user activity and the second history of user activity will be formed at S408. A profile based on one or both of the first history of user activity and second history of user activity is generated at S406. For example, if the second history of user activity is determined to be outdated (e.g., a web search conducted 2 years ago) or not relevant (e.g., user activity in a remote area during a vacation), the profile may be generated based only on the first history of user activity. The profile may still retain the relationship to the second history of user activity for retrieval in form of a hyperlink or the like. Alternatively, a profile may be generated based on both the first history of user activity and the second history of user activity. The profile may provide access to both histories of user activities and may reflect consolidated information based on the two histories.

At S407, if it is determined that the profile already exists for the second history of user activity, the profile may be updated to include information present in the first history of user activity at S409. For example, if the second history of user activity, which is stored earlier in time, indicates that the target user was only interested in value brands, but the first history of user activity indicates that the target user is only interested in premium brands, the profile may reflect the target user's change in preference or socioeconomic status.

At S410, the generated key is transmitted to the user device. The generated key may be updated to include a flag to indicate a relationship to the second history of user activity before being transmitted to the user device, if applicable.

Figure 5:
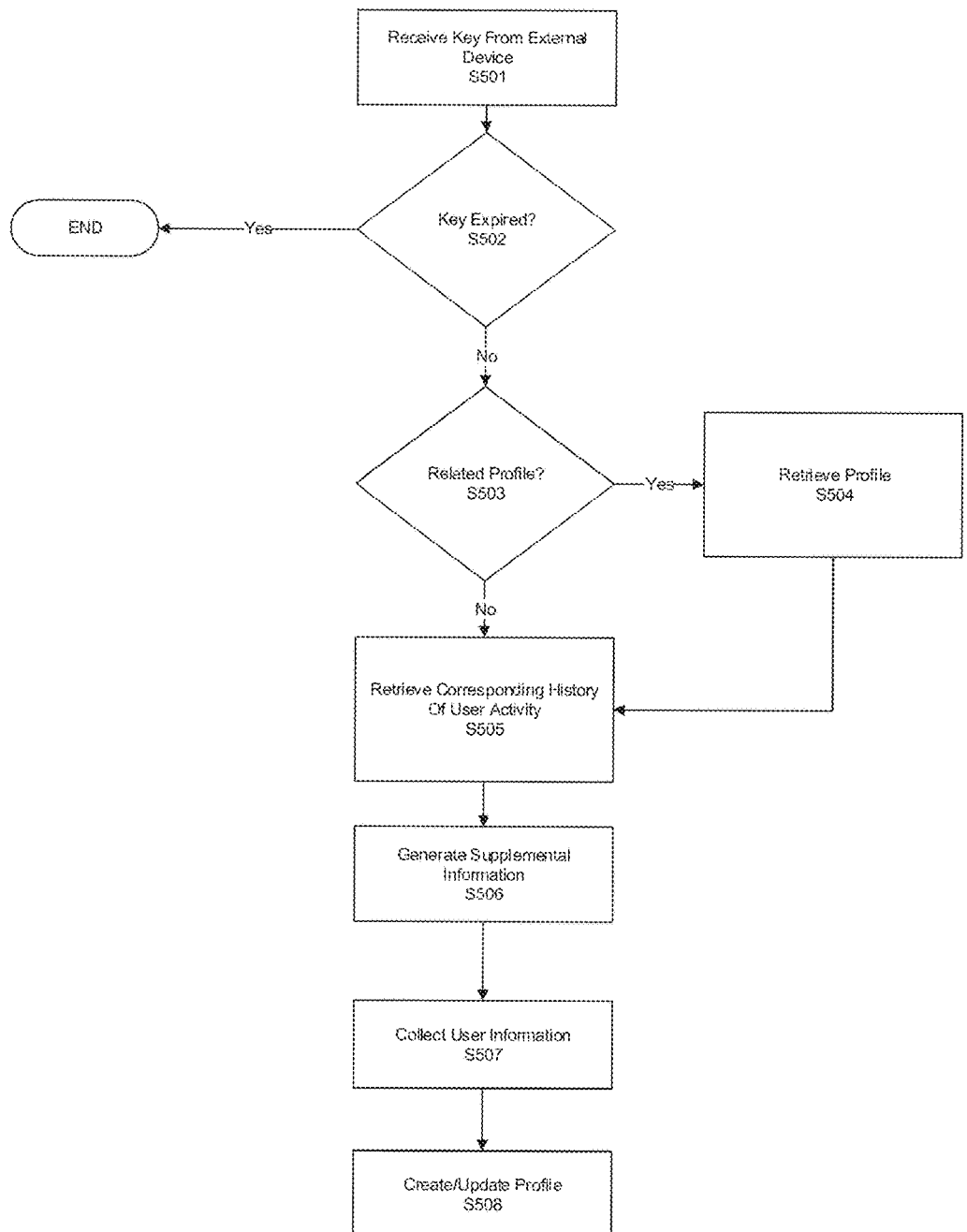
FIG. 5 shows an exemplary method for retrieving a history of user activity information, according to an aspect of the present disclosure.

FIG. 5 shows an exemplary method for retrieving a history of user activity information of another device, according to an aspect of the present disclosure.

At S501, a key is received, at a server, from an external device. The external device may be a computer from a customer support/service center. However, aspects of the disclosure are not limited thereto, such that the external device may be a computing device of another user (e.g., a family member, significant others, etc.,) that the target user seeks to share his/her history of user activity.

Once the key is received, a determination of whether the key has expired is made at S502. Expiration of the key may be determined based on passage of time, number of uses, duration of time between uses if multiple uses are permitted, or other similar conditions.

If the key is determined to have expired at S502, no history of user activity will be retrieved and the process terminates.

If the key is determined not to have expired at S502, presence of a stored profile related to the received key is determined at S503. If a related profile is determined to be stored at S503, the profile corresponding to the key is retrieved at S504. The profile may include information included in a history of user activity corresponding to the received key. The profile may additionally include or refer to information included in a different history of user activity that may or may not correspond to the received key.

At S505, a history of user activity corresponding to the received key is retrieved. If the key is associated with a profile, other histories of user activity, if available, may be retrieved or made available for retrieval. The history of user activity may be a visual representation of stored user activities. For example, screen shots of web pages visited, products reviewed, amount of time spent on a particular webpage or product, and the like may be included in the history of user activity. Further, a written description, such as a text description, of the navigation path taken by the target user may be provided. Similarly, a travel path of a target user through a physical store may be illustrated on a store map with markers to indicate areas where the target user spent significant amount of time in.

At S506, retrieved history of user activity may be analyzed and supplemental information may be generated for easier processing of information. Supplemental information may be provided in form of closed caption, notes, images, or the like. More specifically, if the history of user activity illustrates or otherwise provides some or all of the user activities during a web-searching session on a shopping website (e.g., the clicks the target user may have made, order of pages visited, amount of time spent on each page, product reviewed, products placed in a virtual shopping cart, and the like), a summary of select notable information may be provided for easier understanding of the history of user activity. For example, if the target user spent majority of the time reviewing product A during the web-searching session, a closed caption may be provided to indicate that the target user is interested in product A. Similarly, if the target user spent majority of the time researching technical support for various products, a closed caption may be provided to indicate that the target user is interested in receiving technical support. Using such information, a customer support agent may be able to more quickly understand and address a user's needs. Although the supplemental information is described as secondary information to the history of user activity, aspects of the disclosure are not limited thereto, such that the supplemental information may be provided as primary information to the customer support agent with the history of user activity being made available for reference.

At S507, user information that may be received or collected during an interaction with the target user corresponding to the received key may be stored. For example, the target user may provide biographical or demographical information during a conversation with the customer support agent. Further, the target user may provide email address or basic contact information to receive coupons for a particular product or to be included in a mailing list. User information received may include contact information, address information, name, sex, age, and the like.

At S508, a profile may be created based on the retrieved history of user activity and the collected user information. If the profile already exists for the retrieved history of user activity, the profile may be updated with the collected user information. Accordingly, a profile for the target user may be provided to aid in servicing the target user even if the target user does not create a user account. Further, the customer support agent may have access to more information about a customer that may not typically be provided with a user account.

Figure 6:
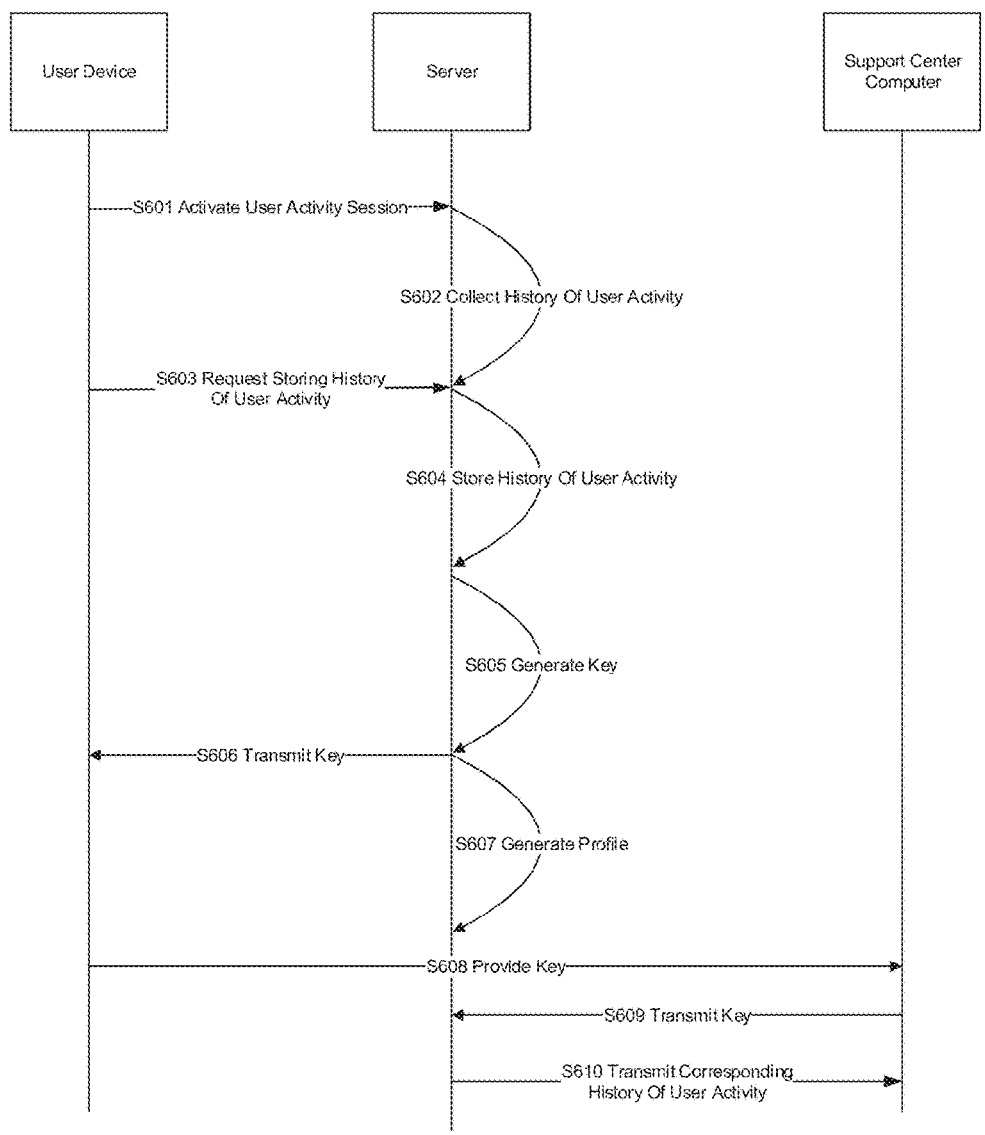
FIG. 6 shows an exemplary communication flow for facilitating an exchange of a history of user activity information between different devices, according to an aspect of the present disclosure.

FIG. 6 shows an exemplary communication flow for facilitating an exchange of a history of user activity information between different devices, according to an aspect of the present disclosure.

At S601, a target user may activate a user activity session, such as an internet session on a shopping website, using a user device. User activity on an active internet session may include navigating through a website using the user device. The internet session may be activated by launching a web-browser on the user device. However, aspects of the disclosure are not limited thereto, such that user activity session may include entry into a brick-and-mortar store, capturing of images, and the like.

A server of the shopping website collects a history of user activity during the active user activity session at S602. The history of user activity may indicate webpages visited, products viewed, amount of time spent viewing a particular webpage or product, a navigation path, and the like.

The user device transmits a request for storing the collected history of user activity at S603. In an example, the target user may trigger the request by clicking on a hyperlink or an icon on a webpage, navigating to a particular webpage (e.g., "contact us" webpage), or by closing the web-browser after certain amount of time passed. The user device may transmit the request when one or more predetermined conditions are met (e.g., viewing a particular webpage more than 5 minutes, reading of product reviews for a particular product, etc.).

The server stores some or all of the collected history of user activity at S604. For example, only webpages where the target user spends more than a predetermined period of time may be stored or included in the history of user activity. Similarly, only webpages of products where the target user researches for additional information (e.g., customer reviews, specification, shipping information, etc.) may be stored or included in the history of user activity.

At S605, the server generates a key based on the stored history of user activity. The key may be, without limitation, a combination of alphanumeric values, a combination of number, or a keyword. The key may be a single-use key such that the key is no longer usable once the corresponding history of user activity is retrieved using the key. However, aspects of the disclosure are not limited thereto, such that that the key may have a limited number of usage, or may have unlimited usage. Further, the key may have an expiration period (e.g., 3 days) before the key is purged from the server or no longer accessible. By providing limited duration of storage, the server may free up more storage space to accommodate other users.

At S606, the server transmits the generated key to the user device of the target user.

At S607, the server generates a profile based on the stored history of user activity. However, aspects of the disclosure are not limited thereto, such that the profile may not be generated or optionally be generated. For example, a profile may be generated when a certain number of related histories of user activities are stored in the server within a specified period of time. Further, the profile may be updated to include user activities of the target user.

At S608, the user device transmits the key to a computer of a support center of the shopping website. For example, the target user may provide an input to the user device to transmit the key to the computer of the support center, or the user device may transmit the key to the computer of the support center automatically. If the target user activates the internet session using a smartphone, and then clicks on a customer support phone number to call the support center, the key may be automatically transmitted with the call. Alternatively, the target user may verbally provide the key received through the user device to a customer support agent using the computer of the support center.

At S609, the computer of the support center transmits the received key to the server to retrieve corresponding history of user activity of the target user.

At 610, the server transmits the corresponding history of user activity of the target user to the computer of the support center.

Figure 7:
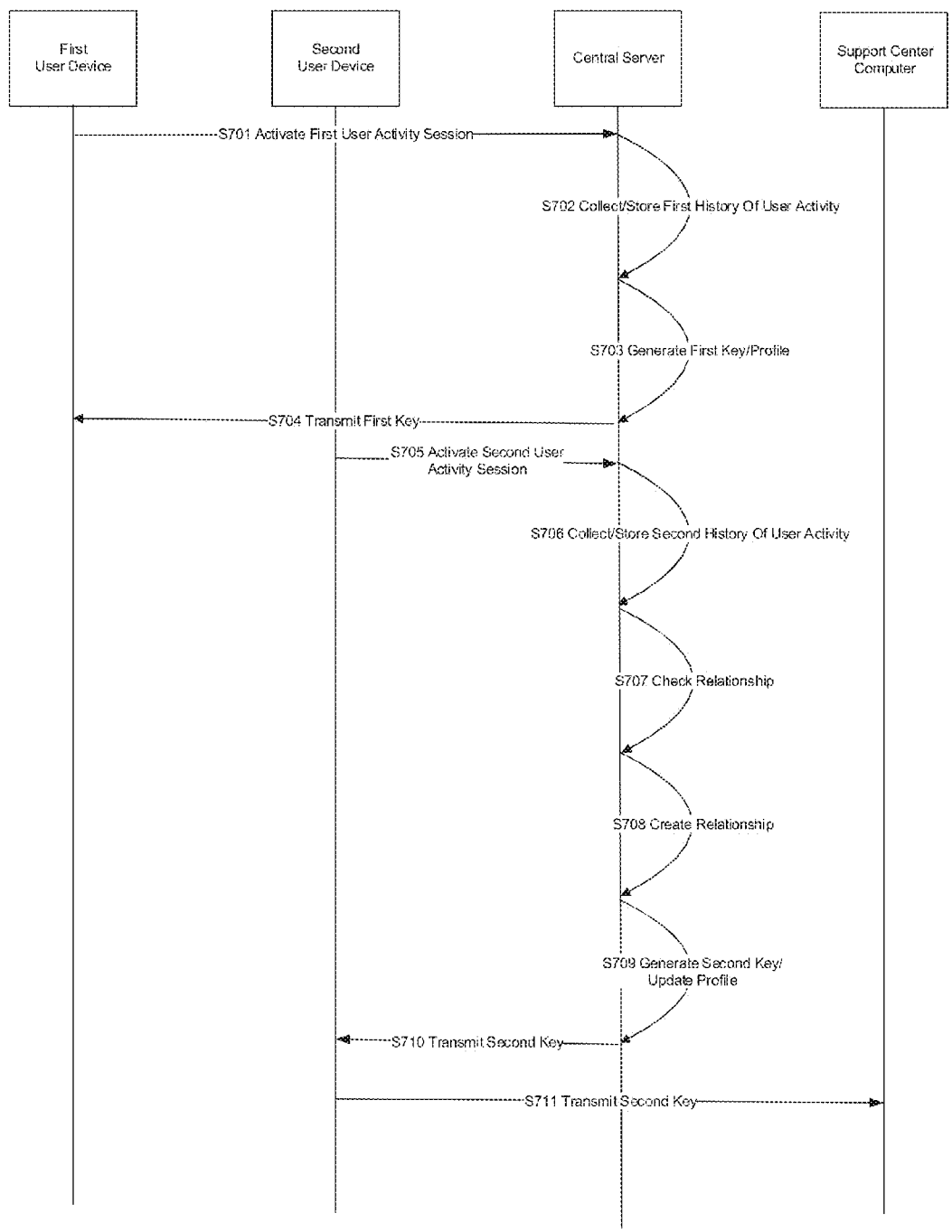
FIG. 7 shows an exemplary communication flow for facilitating an exchange of a history of user activity information between different devices, according to an aspect of the present disclosure.

FIG. 7 shows an exemplary communication flow for facilitating an exchange of a history of user activity information between different devices, according to an aspect of the present disclosure.

At S701, a target user may activate a first user activity session, such as an internet session on a shopping website, using a first user device. The first device may, for example, be a personal computer and the first user activity session may include navigating through the shopping website using the first user device.

A server of the shopping website collects and/or stores a first history of user activity during the active Internet session at S702. The server may store collected first history of user activity automatically or in response to a trigger. For example, the server may begin storing the collected first history of user activity when an activation of user activity session is detected and terminate storing of the collected first history of user activity when the user activity session terminates. Further, the server may store include some or all of the collected user activity as the first history of user activity. A select portion of the collected first history of user activity may be stored based on one or more predetermined conditions.

At S703, the server generates a key and/or a profile based on the stored first history of user activity. If a profile is generated, the generated profile may be stored in the server.

At S704, the server transmits the generated key to the first user device of the target user.

At S705, a target user may activate a second user activity session using a second user device, such as a smart phone. In an example, the second user activity session may be physically navigating through a brick-and-mortar store using the second user device. The second user activity session may be activated when the target user carrying the smart phone enters the brick-and-mortar store. More specifically, the smart phone may include an application corresponding to the brick-and-mortar store, and an entry to the brick-and-mortar store may be detected using radio transmission or GPS technology. The brick-and-mortar store may be a corresponding physical store of the shopping website. The brick-and-mortar store and the shopping website may be serviced or supported by the same server or same set of servers. However, aspects of the present disclosure are not limited thereto, such that the second device may be an in-store device, such as a scanning device or a shopping cart. Such device may initiate an active session based on activating of the respective device or cart through movement or providing of an input.

The server of the brick-and-mortar store collects a second history of user activity during the active second user activity session at S706. The server may store the collected second history of user activity automatically or in response to a trigger. For example, the server may begin storing the collected second history of user activity when an activation of the second user activity session is detected (e.g., entering into the store, activating of a store device, moving of a shopping cart, etc.) and terminate storing of the collected second history of user activity when the second user activity session terminates (e.g., leaving the store, deactivating the store device, returning of the shopping cart, etc.). Further, the server may store some or all of the collected second history of user activity. A select portion of the collected second history user activity may be stored based on one or more predetermined conditions.

At S707, the server checks for a key or profile that is related to the collected or stored second history of user activity. The server may check for identifying information associated with device information to determine a relationship between the first history of user activity and the second history of user activity. For example, if it is determined that the first user device and the second user device is associated with the same phone number, address, user name, legal name, IP address and the like, it may be determined that the first user device and the second user device are associated with the target user. Further, a relationship between the user activities may be determined based on a more macro level, such as a house hold. For example, if the user activities are associated with searches of house hold appliances, a relationship at the household level may be created rather than at the individual user level.

Although the server is described as checking for a relationship between the user activities after the collection or storing of the second history of user activity, aspects of the disclosure are not limited thereto, such that the server may check for such relationship at the detection of the activation of the second user activity session. The server may determine that the first history of user activity is related to the second history of user activity.

At S708, if it is determined that the first history of user activity is related to the second history of user activity, a relationship is generated for the two histories of user activities. Once the relationship between the histories of user activities are detected, a flag may be provided with respect to the second history of user activity to indicate a relationship to a previously stored history of user activity. A flag may also be created for the stored first history of user activity.

The relationship between two histories of user activities may be generated automatically or after an authentication operation. The authentication operation may be performed when it is determined that the first history of user activity is potentially related to the second history of user activity to ensure sensitive information of the target user is not shared with an unintended user. The authentication operation may be performed by, for example, transmitting a request to one or both of the first device and the second device to confirm that the first device and the second device belong to the same target user. More specifically, a request may be sent to one or both of the first device and the second device to provide verification information that may be common to both devices. Verification information may include, without limitation, the key provided to the first device, one or more of a transaction performed on one of the first device or the second device, an email address, a phone number, a home address, a name of the target user, a birthday of the target user, a password, a security question, a payment information, a digital finger print, a retina scan, and the like.

At S709, a second key is generated. The Second key may be the previously transmitted key that is updated to be related to both the first history of user activity and the second history of user activity. Alternatively, a new key may get generated based on both the first history of user activity and the second history of user activity. Further, if a profile exists for the first history of user activity, the profile may be updated with the second history of user activity. If the profile does not exist for the first history of user activity, a profile may be generated to be associated with one or both of the first history of user activity and second history of user activity.

At S710, the server transmits the updated or newly generated key to the second user device of the target user. Further, the server may store the updated profile or newly generated profile.

At S711, the second user device of the target user transmits, to a support center computer, a key corresponding to one or more of the histories of the user activities. However, aspects of the disclosure are not limited thereto, such that the history of user activity may be retrieved by a customer support agent without using a key when such generation of a separate key may not be generated for a particular type of history of user activity. For example, if the history of user activity includes the target user's physical movement within a brick-and-mortar store, a device used by the target user may transmit the collected history of user activity directly to a support center computer by accessing a kiosk within the brick-and-mortar store or by transmitting the collected user activity to an on-site store representative or a customer support agent via a short range communication (e.g., radio communication, Bluetooth®, NFC, and the like). Accordingly, if the collected history of user activity is transmitted from the device of the target user to a kiosk of the brick-and-mortar store, a corresponding key may not be generated and the history of user activity may be retrieved based on an identification number or other information associated with the history of the user activity.

Figure 8:
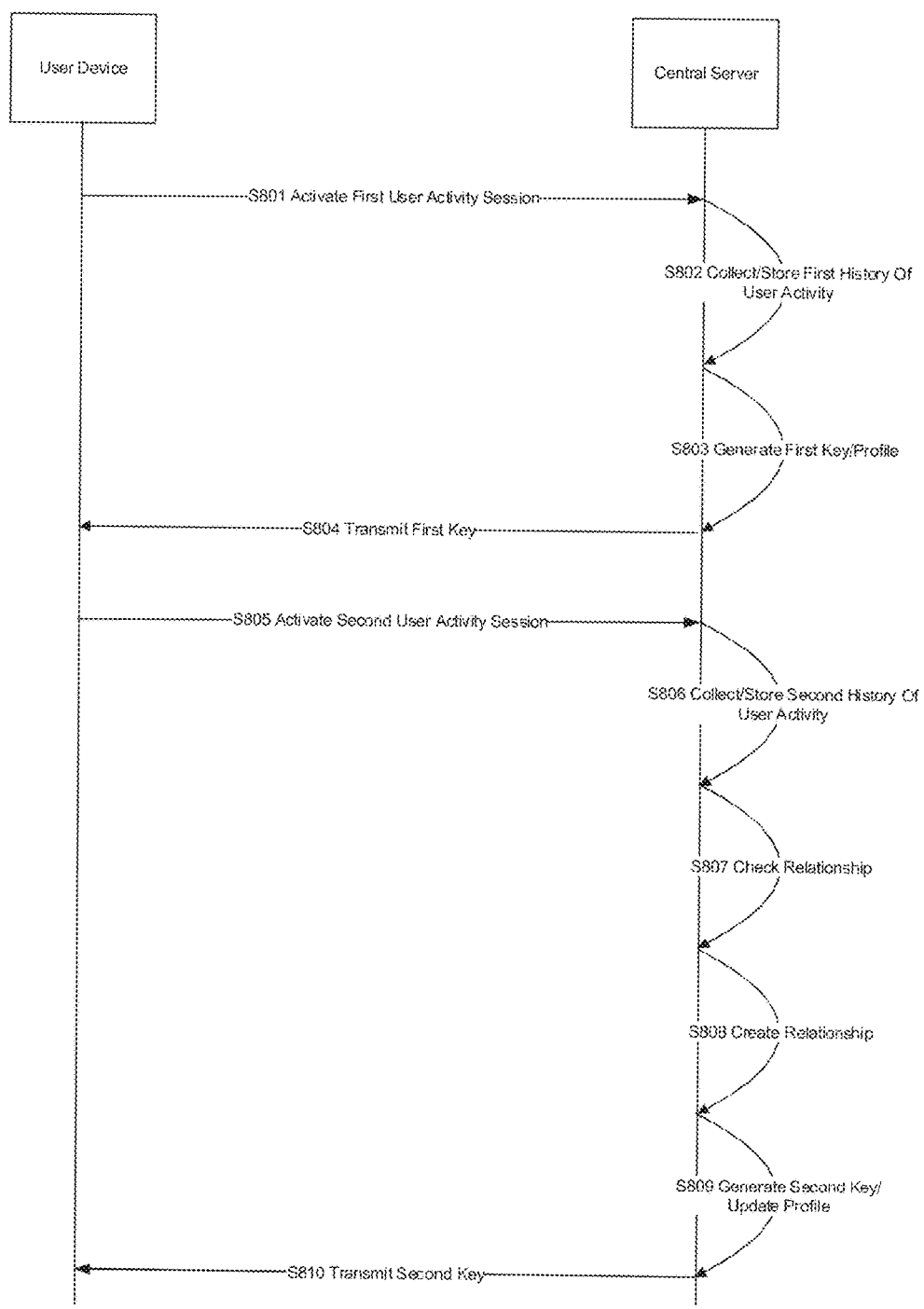
FIG. 8 shows an exemplary communication flow for managing histories of user activity information, according to an aspect of the present disclosure.

FIG. 8 shows an exemplary communication flow for managing histories of user activity information, according to an aspect of the present disclosure.

At S801, a target user activates a first user activity session using a user device.

A server of the shopping website collects and/or stores a first history of user activity during the active first user activity session at S802. The server may store collected first history of user activity automatically or in response to a trigger. For example, the server may begin storing the collected first history of user activity when an activation of a first user activity session is detected and terminate storing of the collected first history of user activity when the first user activity session terminates. Further, the server may store some or all of the collected first history of user activity. A select portion of the collected first history of user activity may be stored based on one or more predetermined conditions.

At S803, the server generates a key and/or a profile based on the stored first history of user activity. If a profile is generated, the generated profile may be stored in the server.

At S804, the server transmits the generated key to the user device of the target user.

At S805, the target user may activate a second user activity session using the same user device. In an example, the second user activity session may include the same type of user activity included in the first user activity session but conducted at a different point in time, or a different user activity.

The server collects a second history of user activity during the active second user activity session at S806. The server may store collected second history of user activity automatically or in response to a trigger. For example, the server may begin storing the collected second history of user activity when an activation of the second user activity session is detected (e.g., entering into the store, activating of a store device, moving of a shopping cart, etc.) and terminate storing of the collected user activity when the second user activity session terminates (e.g., leaving the store, deactivating the store device, returning of the shopping cart, etc.). Further, the server may store some or all of the collected second history of user activity. A select portion of the collected second history of user activity may be stored based on one or more predetermined conditions.

At S807, the server checks for a key or profile that is related to the second history of user activity. For example, the server may check the IP address, IMEI, or other device identifying information to determine a relationship between the first history of user activity and the second history of user activity. Although the server is described as checking for a relationship between the histories of user activities after the collection or storing of the second history of user activity, aspects of the disclosure are not limited thereto, such that the server may check for such relationship at the detection of the activation of the second user activity session.

At S808, if it is determined that the first history of user activity is related to the second history of user activity, a relationship is generated for the two histories of user activities. Once the relationship between the histories of user activities are detected, a flag may be provided with respect to the second history of user activity to indicate a relationship to a previously stored history of user activity. A flag may also be created for the stored first history of user activity.

At S809, a second key may be generated for the second history of user activity. The second key may be the first key that is updated to be related to both the first history of user activity and the second history of user activity. In this scenario, the same key (e.g., keyword) may be provided to the user device. Further, original expiration period indicated with the first key may be updated to reflect a new expiration period. Alternatively, a new key may get generated based on both the first history of user activity and the second history of user activity.

Further, if a profile exists for the first history of user activity, the profile may be updated with the second history of user activity. Alternatively, if the profile does not exist for the first history of user activity, a profile may be generated to be associated with one or both of the first history of user activity and second history of user activity.

At S810, the server transmits the updated or newly generated key to the second user device of the target user. Further, the server may store the updated profile or newly generated profile.

According to an aspect of the present disclosure, a method of sharing a history of activity information between different devices includes collecting, at a server over a network, a first history of user activity of a target user conducted through a first device, storing, in a non-transitory memory of the server, the first history of user activity, generating a key corresponding to the first history of user activity, receiving the key from a second device, and transmitting, to the second device, the first history of user activity.

According to an aspect of the present disclosure, the method further includes transmitting the key to the first device.

According to an aspect of the present disclosure, the method further includes storing device information of the first device, storing and correlating the first history of user activity of the target user with the device information of the first device, collecting a second history of user activity of the target user, and storing and correlating a second history of user activity of the target user with the device information of the first device.

According to an aspect of the present disclosure, the second history of user activity is collected through a third device, and the first device and the third device are accessed by the target user, but not the second device.

According to an aspect of the present disclosure, the second history of user activity is collected from the first device but at a different time than the first history of user activity.

According to another aspect of the present disclosure, the method further includes generating a profile of the target user based on the first history of user activity, and storing the profile of the target user.

According to yet another aspect of the present disclosure, the method further includes updating the key based on the second history of user activity.

According to yet another aspect of the present disclosure, the key is a single-use key with an expiration period.

According to yet another aspect of the present disclosure, the key is generated based on a user interaction with the first device.

According to yet another aspect of the present disclosure, the first history of user activity includes a physical movement of the first device.

According to yet another aspect of the present disclosure, the first history of user activity is stored in response to a trigger operation.

According to yet another aspect of the present disclosure, the first history of user activity includes a history of cursor clicks.

According to yet another aspect of the present disclosure, the first history of user activity includes duration of time spent researching a particular interest.

According to an aspect of the present disclosure, the first history of user activity includes a visual representation of a navigation path through a website via the first device.

According to an aspect of the present disclosure, the first history of user activity includes an image obtained with the first device.

According to an aspect of the present disclosure, the first history of user activity includes product information scanned with the first device.

According to an aspect of the present disclosure, the second device is a computer at a support center.

According to an aspect of the present disclosure, the method further includes requesting authentication information from the second device, and authenticating the second device before transmitting the first history of user activity to the second device.

According to an aspect of the present disclosure, a tangible non-transient computer readable storage medium that stores a computer program, the computer program, when executed by a processor, causing a computer apparatus to perform a process including collecting, over a network, a first history of user activity of a target user conducted through a first device, storing, in a non-transitory memory, the first history of user activity, generating a key corresponding to the first history of user activity, receiving the key from a second device, and transmitting, to the second device, the first history of user activity.

According to an aspect of the present disclosure, a computer apparatus includes a memory that stores instructions, and a processor that executes the instructions. When executed by the processor, the instructions cause the processor to perform the following operations: collecting, over a network, a first history of user activity of a target user conducted through a first device, storing the first history of user activity, generating a key corresponding to the first history of user activity, receiving the key from a second device, and transmitting, to the second device, the first history of user activity.

Accordingly, a system and method for exchanging a history of user activity information enables a first party (e.g., a customer support agent) to receive a second party's previous user activity for improved contextual understanding when the first party interacts with the second party. By facilitating the exchange of histories of user activity information, a target user may receive improved service by providing a service party of history of user activity of the target user. Further, a profile may be generated based on the history of user activity, such that a servicing party may be able to obtain information of a user without creation of a user account by the user. Also, by selectively collecting and storing user activity information, computing resources may be more efficiently managed.

Although a system and method for exchanging a history of user activity information has been described with reference to several exemplary embodiments, it is understood that the words that have been used are words of description and illustration, rather than words of limitation. Changes may be made within the purview of the appended claims, as presently stated and as amended, without departing from the scope and spirit of the system and method for exchanging a history of user activity information has been described with reference to particular means, materials and embodiments, the system and method for exchanging a history of user activity information is not intended to be limited to the particulars disclosed; rather the system and method for exchanging a history of user activity information extends to all functionally equivalent structures, methods, and uses such as are within the scope of the appended claims.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, the communication channels and unified menus described herein represent examples of the state of the art. Such standards are periodically superseded by more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to make or use the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of sharing a history of activity information between different devices, the method comprising:
   collecting, at a server over a network, a first history of user activity of a target user conducted through a first device;
   determining a presence of a trigger in the first history;
   when the trigger is not detected in the first history, deleting the first history collected;
   when the trigger is detected in the first history, storing, in a non-transitory memory of the server, the first history of user activity;
   generating, at the server, a first key corresponding to the first history of user activity;
   generating a user profile corresponding to the first key;
   transmitting, to the first device, the first key;
   collecting, at the server over the network, a second history of user activity of the target user conducted through a second device;
   generating, at the server, a second key corresponding to the second history of user activity;
   determining whether a relationship exists between the first device and the second device;
   when it is determined that the relationship exists, updating the user profile to be associated with both the first history and the second history;
   transmitting, to the second device, the second key corresponding to the updated user profile;
   transmitting, by the second device to a third party device, the second key corresponding to the updated user profile; and
   retrieving and transmitting the updated user profile to the third party device when the second key is received from the third party device,
   wherein the trigger is a physical action performed by the target user.

2. The method according to claim 1, further comprising:
   storing device information of the first device;
   storing and correlating the first history of user activity of the target user with the device information of the first device; and
   storing and correlating the second history of user activity of the target user with the device information of the first device.

3. The method according to claim 1, further comprising collecting a third history of user activity of the target user, wherein the third history of user activity is collected from the first device but at a different time than the first history of user activity.

4. The method according to claim 1, further comprising:
   receiving the first key from a third device of the target user; and
   transmitting, to the third device, the first history of user activity.

5. The method according to claim 4, wherein the third device is a computer at a support center.

6. The method according to claim 4, further comprising:
   requesting authentication information from the third device; and
   authenticating the third device before transmitting the first history of user activity to the third device.

7. The method according to claim 4, wherein the first device and the second device are accessed by the target user, but not the third device.

8. The method according to claim 1, further comprising: updating the first key based on the second history of user activity.

9. The method according to claim 1, wherein each of the first key and the second key is a single-use key with an expiration period.

10. The method according to claim 1, wherein the first key is generated based on a user interaction with the first device.

11. The method according to claim 1, wherein the first history of user activity further includes a history of cursor movement.

12. The method according to claim 1, wherein the first history of user activity further includes duration of time spent researching a particular interest.

13. The method according to claim 1, wherein the first history of user activity further includes a visual representation of a navigation path through a website via the first device.

14. The method according to claim 1, wherein the first history of user activity further includes an image obtained with the first device.

15. The method according to claim 1, wherein the first history of user activity further includes product information scanned with the first device.

16. A tangible non-transitory computer readable storage medium that stores a computer program, the computer program, when executed by a processor, causing a computer apparatus to perform a process comprising:

collecting, over a network, a first history of user activity of a target user conducted through a first device;

determining a presence of a trigger in the first history;

when the trigger is not detected in the first history, deleting the first history collected;

when the trigger is detected in the first history, storing, in a non-transitory memory, the first history of user activity;

generating a first key corresponding to the first history of user activity;

generating a user profile corresponding to the first key;

transmitting, to the first device, the first key;

collecting, over the network, a second history of user activity of the target user conducted through a second device;

generating a second key corresponding to the second history of user activity;

determining whether a relationship exists between the first device and the second device;

when it is determined that the relationship exists, creating a relationship between the first history and the second history;

transmitting, to the second device, the second key corresponding to the updated user profile;

transmitting, by the second device to a third party device, the second key corresponding to the updated user profile; and retrieving and transmitting the updated user profile to the third party device when the second key is received from the third party device, wherein the trigger is a physical movement of the first device from a predetermined area.

17. A computer apparatus, comprising:

a memory that stores instructions, and a processor that executes the instructions, wherein, when executed by the processor, the instructions cause the processor to perform operations comprising:

collecting, over a network, a first history of user activity of a target user conducted through a first device;

determining a presence of a trigger in the first history;

when the trigger is not detected in the first history, deleting the first history collected;

when the trigger is detected in the first history, storing the first history of user activity;

generating a first key corresponding to the first history of user activity;

generating a user profile corresponding to the first key;

transmitting, to the first device, the first key;

collecting, over the network, a second history of user activity of the target user conducted through a second device;

generating a second key corresponding to the second history of user activity;

determining whether a relationship exists between the first device and the second device;

when it is determined that the relationship exists, creating a relationship between the first history and the second history;

transmitting, to the second device, the second key corresponding to the updated user profile;

transmitting, by the second device to a third party device, the second key corresponding to the updated user profile; and retrieving and transmitting the updated user profile to the third party device when the second key is received from the third party device, wherein the trigger is a physical movement of the first device from a predetermined area.

* * * * *